United States Patent Office 2,709,181
Patented May 24, 1955

2,709,181

PROCESS FOR PREPARING CHLOROFLUORO-ETHYLENES

Marvin R. Frederick, Brecksville, Ohio, assignor to The B. F. Goodrich Company, New York, N. Y., a corporation of New York No Drawing. Application April 8, 1952,
Serial No. 281,263

3 Claims. (Cl. 260—653)

This invention relates to an improved process for preparing chlorofluoroethylenes, and particularly to the preparation of such compounds by dehydrochlorination of chlorofluoroethanes with an aqueous solution of an alkali hydroxide in the presence of a surface-active agent.

Chlorofluoroethylenes such as

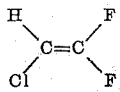

and

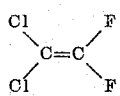

have been prepared by chemical dehydrochlorination of the appropriate chlorofluoroethane, using, for instance, an aqueous potassium hydroxide solution containing methanol. Such processes do not result in optimum yields and undesirable side reactions involving methanol occur. For example, 1-methoxy-1,1-difluoro-2,2-dichloroethane is an undesirable byproduct resulting from the preparation of dichlorodifluoroethylene,

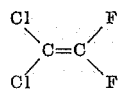

by this method.

It is an object of this invention to provide a process for preparing chlorofluoroethylenes by chemical dehydrochlorination of the appropriate chlorofluoroethane, wherein undesirable side reactions do not occur. Another object is to attain improved total yields of the desired product. A further object is to obtain faster reaction rates.

I have now discovered that these and other objects are readily accomplished by dehydrochlorinating chlorofluoroethanes with a methanol free aqueous solution of an alkali hydroxide in the presence of a surface-active agent. When proceeding in this manner no undesirable side reactions occur, and the reaction, quite unexpectedly, proceeds very smoothly at a much more rapid rate and to a higher yield than is ordinarily experienced.

In the preferred practice of my invention a chlorofluoroethane is mixed with a small amount of a surface-active agent and the resulting mixture is brought into effective contact with, preferably by the slow addition thereto of, a sufficient amount of an aqueous solution of an alkali metal hydroxide to liberate the chlorofluoroethylene and neutralize the hydrogen chloride resulting from the dehydrochlorination reaction. The reaction is preferably carried out at a temperature such that the liberated chlorofluoroethylene distills off as it is formed and is thereby separated from the reaction mixture in substantially pure form.

About one percent of an oil-soluble surface-active agent dissolved in the chlorofluoroethane is preferably used, and a slight molar excess of a water solution of an alkali hydroxide of about 33 percent concentration is added to the chlorofluoroethane at a temperature of about 50° C. at such a rate as to keep the reaction under control. The order of addition may be reversed and the chlorofluoroethane added to the alkali hydroxide solution. When this technique is followed, use of a small amount of a water-soluble surface-active agent may be desirable.

The chlorofluoroethane preferably employed is 1,1-difluoro-1,2,2-trichloroethane which on dehydrochlorination gives 1,1-difluoro-2,2-dichloroethylene. However, there may also be used other chlorofluoroethanes containing a hydrogen atom attached to one of the carbon atoms and a chlorine atom attached to the other carbon atom and otherwise containing, attached to either or both carbons at least one other chlorine atom and at least one fluorine atom, in which event one molecule of hydrogen chloride is eliminated with the production of a chlorofluoroethylene on suitable treatment. For example,

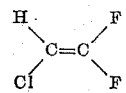

is prepared from

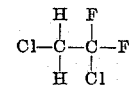

and other chlorofluoroethylenes such as

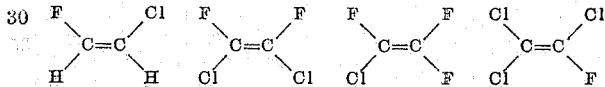

are likewise prepared from the appropriate chlorofluoroethane.

The type of surface-active agent utilized in the practice of this invention is not critical and may be any of the anionic, cationic or non-ionic types described on page 109 of Surface Active Agents by Young and Coons, and listed between pages 117 and 152 of the same text. The surface active agents most useful and preferred are the oil-soluble materials. Representative of this class are the aralkyl sulfonates such as alkyl naphthalene sulfonate, fatty acid esters such as sorbitan oleate and glyceryl oleate, and naturally occurring materials of the soya bean lecithin type. Water-soluble surface-active agents are useful since a phase inversion often occurs during the course of the reaction. Water-soluble surface-active agents of considerable utility in this invention include the salts of alkyl sulfates and sulfonates and their derivatives and the amine type agents and their derivatives. Mixtures of oil and water-soluble surface active agents are also particularly useful. Also useful are the organophilic clays and polymeric electrolytes.

The amount of surface-active agent preferably used is about one percent based on the amount of the chlorofluoroethane. One-half percent is satisfactory and even as little as one-tenth percent is operative. More than one percent may be used but is generally an unnecessary excess.

The alkali hydroxide solution used to dehydrochlorinate the chlorofluoroethane is preferably aqueous potassium hydroxide or sodium hydroxide, although the alkaline earth metal hydroxides may also be used. A slight molar excess of the alkali hydroxide is required to obtain the best yield of desired product, 0.1 mol excess generally being sufficient. Concentrations of the alkali hydroxide solutions from 30 to 40 percent are the most efficient for the purposes of this invention. The alkali hydroxide solution is preferably added to the reaction mixture as rapidly as possible while maintaining the reaction under control. As has already been mentioned, the chlorofluoroethane may be added to the alkali hydroxide solution but is preferably reacted by adding the alkali hydroxide solution to the chlorofluoroethane.

In carrying out the reaction, the temperature preferred is from 40 to 60° C. When dehydrochlorinating 1,1-difluoro-1,2,2-trichloroethane at reaction temperatures below 40° C. the reaction is slow in starting, and at temperatures above 60° C. more difficulty is experienced in collecting and retaining the volatile 1,1-difluoro-2,2-dichloroethylene (B. P. 19° C.), although this may be adequately handled by proper mechanical techniques.

The following examples are given to illustrate applications of this invention.

*Example 1*

3729 grams (22 moles) of 1,2,2-trichloro-1,1-difluoroethane containing 20 grams (0.5%) of a soya bean lecithin known as Yelkin TT is added to a 5 liter, 3 neck flask. This reaction vessel is equipped with a thermometer extending into the reaction mixture, a dropping funnel, a mechanical stirrer and water cooled reflux condenser with a take off tube attached in such a way that gas from the top of the reflux condenser will go to a dry ice acetone trap where the product is collected. The reactor is heated with a Glas-col heating mantle to about 50° C. 968 grams (24.2 moles) of sodium hydroxide dissolved in 2 liters of water is added slowly until the reaction starts. When the reaction starts the 1,1-difluoro-2,2-dichloroethylene distills off vigorously from the reaction mixture. The flow of water through the reflux condenser is controlled so that the temperature of the effluent water is 22 to 25° C. The reaction temperature is maintained from 45 to 60° C. The alkali hydroxide solution addition requires about 2 hours. The distillation of product from the reaction mixture into the receiver is usually completed before all of the alkali hydroxide solution is added. The reaction product, 1,1-difluoro-2,2-dichloroethylene is washed with ice water. Because of the volatile nature of the monomer, care must be taken to avoid evaporation losses. The monomer is decanted from the wash water and distilled through a 1-inch diameter column of 6 to 8 inches of 4-mesh anhydrous calcium chloride and 20 inches of ⅛ inch glass helices. 2623 grams (19.7 moles) of 1,1-difluoro-2,2-dichloroethylene, boiling point 19–21° C. is obtained. This represents a yield of 97 percent.

This result may be compared to those obtained by treating 1,1-difluoro-1,2,2-trichloroethane with an aqueous solution of potassium hydroxide containing methanol at 50–60° C., in which reaction times of three to eight hours, yields of 85 to 75 percent and some 1-methoxy-1,1-difluoro-2,2-dichloroethane as an undesirable by-product are obtained.

*Example 2*

Using essentially the same procedure outlined in Example 1, but with 0.5 percent alkyl naphthalene sulfonate employed in place of lecithin, yields of 1,1-difluoro-2,2-dichloroethylene in excess of 90 percent in about 2 hours are obtained.

*Example 3*

Using essentially the same procedure outlined in Example 1, one percent of soya bean lecithin is dissolved in 1,2-dichloro-2,2-difluoroethane and the mixture treated at about 50° C. with a slight molar excess of a 30 percent solution of sodium hydroxide. 1-chloro-2,2-difluoroethylene in good yield is obtained.

The examples given hereinbefore are only illustrative embodiments of my invention, and I do not desire or intend to be limited solely thereto, but only as required by the spirit and scope of the appended claims.

I claim:

1. The process for preparing 1,1-difluoro-2,2-dichloroethylene from 1,1-difluoro-1,2,2-trichloroethane which comprises reacting 1,1-difluoro-1,2,2-trichloroethane with an excess of an alkali hydroxide in aqueous solution in the presence of a small amount of an oil-soluble surface-active agent selected from the class consisting of aralkyl sulfonates and soya bean lecithins.

2. The process for preparing 1,1-difluoro-2,2-dichloroethylene from 1,1-difluoro-1,2,2-trichloroethane which comprises reacting 1,1-difluoro-1,2,2-trichloroethane with 0.1 molar excess of sodium hydroxide in 30 to 40 percent aqueous solution in the presence of about 1 percent of soya bean lecithin, calculated on the weight of difluorotrichloroethane utilized, at a temperature of 40 to 60° C., and collecting by condensation the liberated difluorodichloroethylene.

3. The process for preparing 1,1-difluoro-2,2-dichloroethylene from 1,1-difluoro-1,2,2-trichloroethane which comprises reacting 1,1-difluoro-1,2,2-trichloroethane with about 0.1 molar excess of sodium hydroxide in 30 to 40 percent aqueous solution in the presence of about 1 percent alkyl naphthalene sulfonate, calculated on the weight of difluorotrichloroethane utilized, at a temperature of 40 to 60° C., and collecting by condensation the liberated difluorodichloroethylene.

References Cited in the file of this patent

UNITED STATES PATENTS

| | | |
|---|---|---|
| 2,322,258 | Strosacker et al. | June 22, 1943 |
| 2,566,807 | Padbury et al. | Sept. 4, 1951 |

OTHER REFERENCES

"Handbook of Chemistry and Physics," 30th ed., page 1720 (1947).

Schwartz et al.: "Surface Active Agents," pages 205–6 (1949).